(12) United States Patent
Hansen (10) Patent No.: US 7,054,099 B2
(45) Date of Patent: *May 30, 2006

(54) METHODS AND SYSTEMS FOR MOVING A READ/WRITE HEAD TO A VELOCITY AND POSITION WHERE IT IS USEFUL TO SWITCH FROM A DECELERATION PHASE TO A SETTLING PHASE OF A SEEK OPERATION

(75) Inventor: Fred R. Hansen, Boulder, CO (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/958,013

(22) Filed: Oct. 4, 2004

(65) Prior Publication Data

US 2006/0072238 A1 Apr. 6, 2006

(51) Int. Cl.
*G11B 5/596* (2006.01)
(52) U.S. Cl. .................................................. 360/78.06
(58) Field of Classification Search ...................... None
See application file for complete search history.

(56) References Cited

U.S. PATENT DOCUMENTS

| | | | |
|---|---|---|---|
| 4,982,298 A | 1/1991 | Volz et al. | |
| 5,182,684 A | 1/1993 | Thomas et al. | |
| 5,343,131 A | * 8/1994 | Baumann | ..................... 318/561 |
| 5,465,035 A | * 11/1995 | Scaramuzzo et al. | ....... 318/561 |
| 5,600,506 A | 2/1997 | Baum et al. | |
| 5,793,558 A | 8/1998 | Codilian et al. | |
| 6,002,544 A | 12/1999 | Yatsu | |
| 6,084,742 A | 7/2000 | Takaishi et al. | |
| 6,140,791 A | 10/2000 | Zhang | |
| 6,148,240 A | * 11/2000 | Wang et al. | ................... 700/63 |

(Continued)

FOREIGN PATENT DOCUMENTS

EP 0 111 654 6/1984

OTHER PUBLICATIONS

Bellman, R. et al., "Dynamic Programming and Adaptive Processes: Mathematical Foundation," IRE Transactions on Automatic Control, pp. 5-10 (Jan. 1960).

(Continued)

*Primary Examiner*—K. Wong
(74) *Attorney, Agent, or Firm*—Fliesler Meyer LLP (57) ABSTRACT

Improved deceleration control for a disk drive is provided. A deceleration profile is selected based on a present velocity ($v_i$), a present position ($x_i$) and a BEMF constant associated with a voice coil motor (VCM), wherein the deceleration profile is useful for moving the read/write head to a point in phase space (defined by a target velocity and a target position) where it is efficient to hand-off control of a seek operation from a deceleration controller to a seek controller. A control signal is supplied to a VCM driver in an attempt to have a read/write head follow the selected deceleration profile. As new present velocities and new present positions are obtained, these steps are repeated until the seek operation transitions from the deceleration phase to a settle phase. This description is not intended to be a complete description of, or limit the scope of, the invention. Other features, aspects, and objects of the invention can be obtained from a review of the specification, the figures and the claims.

58 Claims, 6 Drawing Sheets

U.S. PATENT DOCUMENTS

| | | | |
|---|---|---|---|
| 6,163,430 A * | 12/2000 | Hansen | 360/78.06 |
| 6,178,060 B1 * | 1/2001 | Liu | 360/78.07 |
| 6,510,019 B1 | 1/2003 | DeRosa | |
| 6,590,735 B1 * | 7/2003 | Brittner et al. | 360/78.07 |
| 6,611,658 B1 | 8/2003 | Takahashi | |
| 6,629,089 B1 | 9/2003 | Supino | |
| 6,687,081 B1 | 2/2004 | O'Hara et al. | |
| 6,690,537 B1 | 2/2004 | Kagami et al. | |
| 6,873,490 B1 | 3/2005 | Guo et al. | |
| 6,937,431 B1 * | 8/2005 | Galloway | 360/78.06 |

OTHER PUBLICATIONS

Bellman, R. et al., "History and Development of Dynamic Programming," Control Systems Magazine, pp. 24-28 (Nov. 1984).

* cited by examiner

METHODS AND SYSTEMS FOR MOVING A READ/WRITE HEAD TO A VELOCITY AND POSITION WHERE IT IS USEFUL TO SWITCH FROM A DECELERATION PHASE TO A SETTLING PHASE OF A SEEK OPERATION

FIELD OF THE INVENTION

Embodiments of the present invention relate to seek operations of a disk drive, and more specifically, to the deceleration phase of seek operations.

CROSS REFERENCE TO RELATED APPLICATIONS

The present application is related to commonly invented and commonly assigned U.S. patent application Ser. No. 10/958,057, entitled METHODS AND SYSTEMS FOR IMPROVED DECELERATION CONTROL FOR A DISK DRIVE, which was filed the same day as the present application, and which is incorporated herein by reference.

BACKGROUND

The movement of a read/write head of a disk drive from a present position to a desired position, where the head can read data from or write data to information bearing tracks thereof, is referred to as a "seek operation" between tracks. Preferably, the seek operation takes as little time as possible, consistent with minimum final position error and settle time prior to entering the track following phase in which data may be read or written. Track following relies on the head reading position reference information, frequently referred to as "servo burst patterns", on at least one disk surface. Such position reference information may either be on a dedicated servo surface and read by a dedicated servo head or it may be dispersed (i.e., embedded) as servo sectors on the data surface and read by the data head. Generally, the position reference information does not give an absolute position of the head but only an offset position relative to a single track or within a small group of tracks. The seek operation conventionally uses this information to update a register containing either the absolute position or the number of tracks to go to the desired track.

A seek operation typically includes an "acceleration phase" during which the head is accelerated (e.g., in an open loop fashion) toward the desired position (e.g., a desired track), followed by a "deceleration phase" in which the head is decelerated (e.g., under some sort of closed loop control) to come to rest approximately on the desired track. There may also be an intermediate "coasting phase" between the acceleration and deceleration phases. Additionally, following the deceleration phase there is typically a "settle phase" and an "on-track phase" that are used for finer position adjustment of the read/write head.

During the deceleration phase, many disk drives use what is known as a Proximate Time Optimal Servo (PTOS) deceleration control algorithm. With a PTOS algorithm, in order to move a read/write head from a present position (e.g., a present track) to a desired position (e.g., a desired track), a single deceleration profile (in phase space) is determined. Then, a linear velocity controller is used to try to hold the head (through control of an actuator assembly including a voice coil motor) to that predetermined single deceleration profile. As the head deviates from the predetermined single profile, the linear velocity controller drives the head higher or lower in phase space to get it back to that profile. More specifically, using a PTOS type algorithm a servo system determines the head's present velocity and present position (e.g., the remaining distance to the desired track) at each sample time or track crossing, and compares the present velocity/position with the predetermined single deceleration profile. Based on this comparison, the servo system appropriately increases or decreases the drive current to the voice coil motor (VCM) if the velocity is above or below the velocity given by the predetermined deceleration profile, in an attempt to follow the predetermined profile. This will now be explained with reference to the phase space diagram of FIG. 1.

Figure 1:
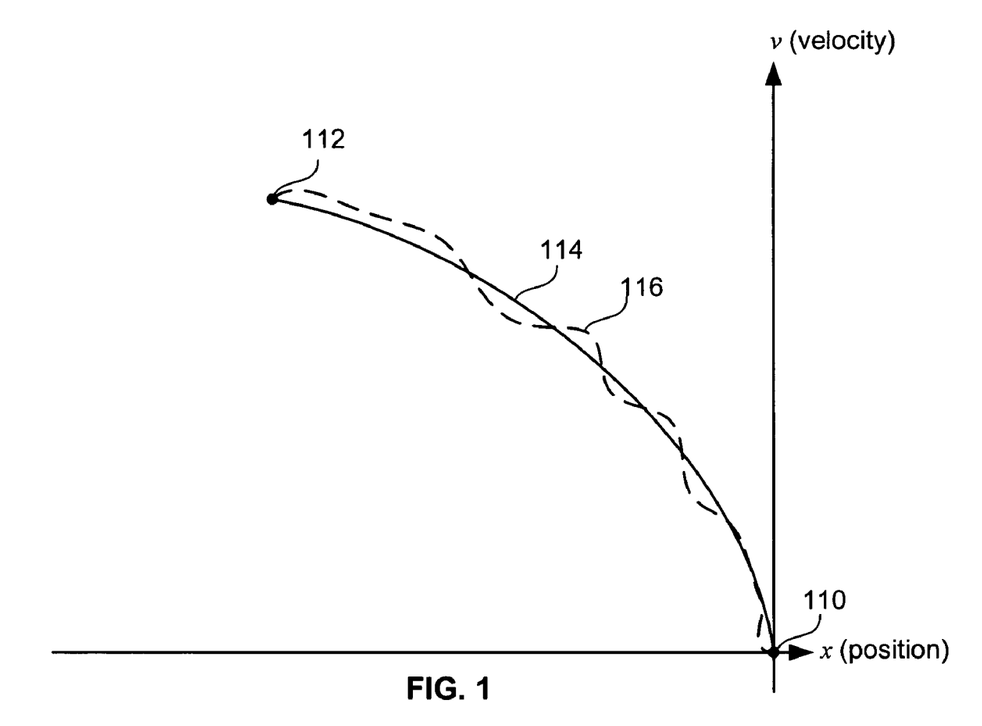
FIG. 1 is a phase space diagram that is useful for describing the deficiencies of the prior art PTOS algorithms.

FIG. 1 is a phase space diagram, with the axis labeled x representing position of a read/write head, and the axis labeled v representing velocity of the head. In the diagram, the origin 110 represents zero velocity and zero distance from the desired position, and a point in space 112 represents the present velocity and present position of the head. The present position can be, e.g., in terms of the number of tracks (e.g., 3500 tracks) from the desired track. In FIG. 1, the solid line 114 represents an exemplary single deceleration profile that was determined using a PTOS type algorithm. The dashed line 116 represents the exemplary movement of the head, in phase space, as it moves from the present velocity/position 112 to the desired velocity/position 110. Notice how the dashed line oscillates around the desired trajectory 114 in an aim to get the head back to the desired trajectory. It would be beneficial to reduce and preferably eliminate the inefficiencies associated with trying to drive the head higher or lower in phase space to get it back to the desired trajectory.

SUMMARY

Embodiments of the present invention are useful in disk drive systems that include a read/write head, an actuator assembly including a voice coil motor (VCM) that is used to control movement of the read/write head, and a VCM driver that drives the VCM, wherein the VCM has an associated back electromagnetic field (BEMF) constant. More specifically, embodiments of the present invention are directed to methods and systems for controlling the deceleration phase of a seek operation that is used to move the read/write head to a desired velocity and a desired position in phase space.

Rather than controlling velocity in an effort to keep the read/write head on a single predetermined phase space deceleration profile, as is done with PTOS type algorithms (described above in the Background section), embodiments of the present invention treat velocity control as an "endpoint boundary value problem." Stated another way, with embodiments of the present invention, each time a new present velocity/position of a read/write head is determined (e.g., at each sample time or track crossing), rather than adjusting the velocity to try to get the head back to a previously selected deceleration profile (as was explained with reference to FIG. 1), there is a new determination of a preferred way to get the head from its new present velocity/position to the desired position.

In accordance with embodiments of the present invention, a deceleration profile is selected based on a present velocity ($v_i$), a present position ($x_i$) and the BEMF constant. Next, a control signal is supplied to the VCM driver in an attempt to have the read/write head follow the selected deceleration profile. As new present velocities and new present positions are obtained, the above mentioned steps are repeated until the seek operation transitions from the deceleration phase to a settle phase. Stated another way, these steps are repeated until a deceleration controller hands-off control to a settle controller, with both controllers likely being part of a seek controller implemented in a microprocessor.

More specifically, when a new present velocity and a new present position are obtained, a new deceleration profile is selected based on the new present velocity most recently obtained, the new present position most recently obtained, and the BEMF constant, and the control signal is supplied to the VCM driver in an attempt to have the read/write head follow the new deceleration profile most recently selected.

It is noted that the BEMF constant (associated with the VCM) can differ for different positions along a stroke of a drive. Accordingly, in accordance with embodiments of the present invention, the BEMF constant used when selecting each new deceleration profile can be the BEMF constant corresponding to a present position.

Some embodiments of the present invention are directed to moving the read/write head to a point in phase space (defined by a target velocity and a target position) where it is efficient to hand-off control of a seek operation from a deceleration controller to a seek controller. This can be accomplished by obtaining a present velocity and a present position of the read/write head, and then selecting a deceleration profile that can be used to move the read/write head from the present velocity and the present position to the target velocity and the target position that are offset, respectively, from a desired velocity and a desired position associated with a desired track. The selected deceleration profile can then be used to control movement of the read/write head toward the target velocity and the target position. As new present velocities and new present positions are obtained, these steps are repeated until the read/write head has substantially reached that point in phase space where it is efficient to hand-off control of the seek operation from the deceleration controller to the seek controller.

The above summary is not intended to be a complete description of, or limit the scope of, the invention. Further embodiments, features, aspects, and advantages of the present invention will become more apparent from the detailed description set forth below, the drawings and the claims.

DETAILED DESCRIPTION

Prior to describing embodiments of the present invention in detail, it is useful to first describe an exemplary disk drive and an exemplary seek controller included in such a disk drive. However, it should be understood that embodiments of the present invention can also be used with disk drives and seek controllers that differ from those described below. Accordingly, embodiments of the present invention should not be limited to use with the exemplary disk drive and the exemplary seek controller described below.

Exemplary Disk Drive

Figure 2:
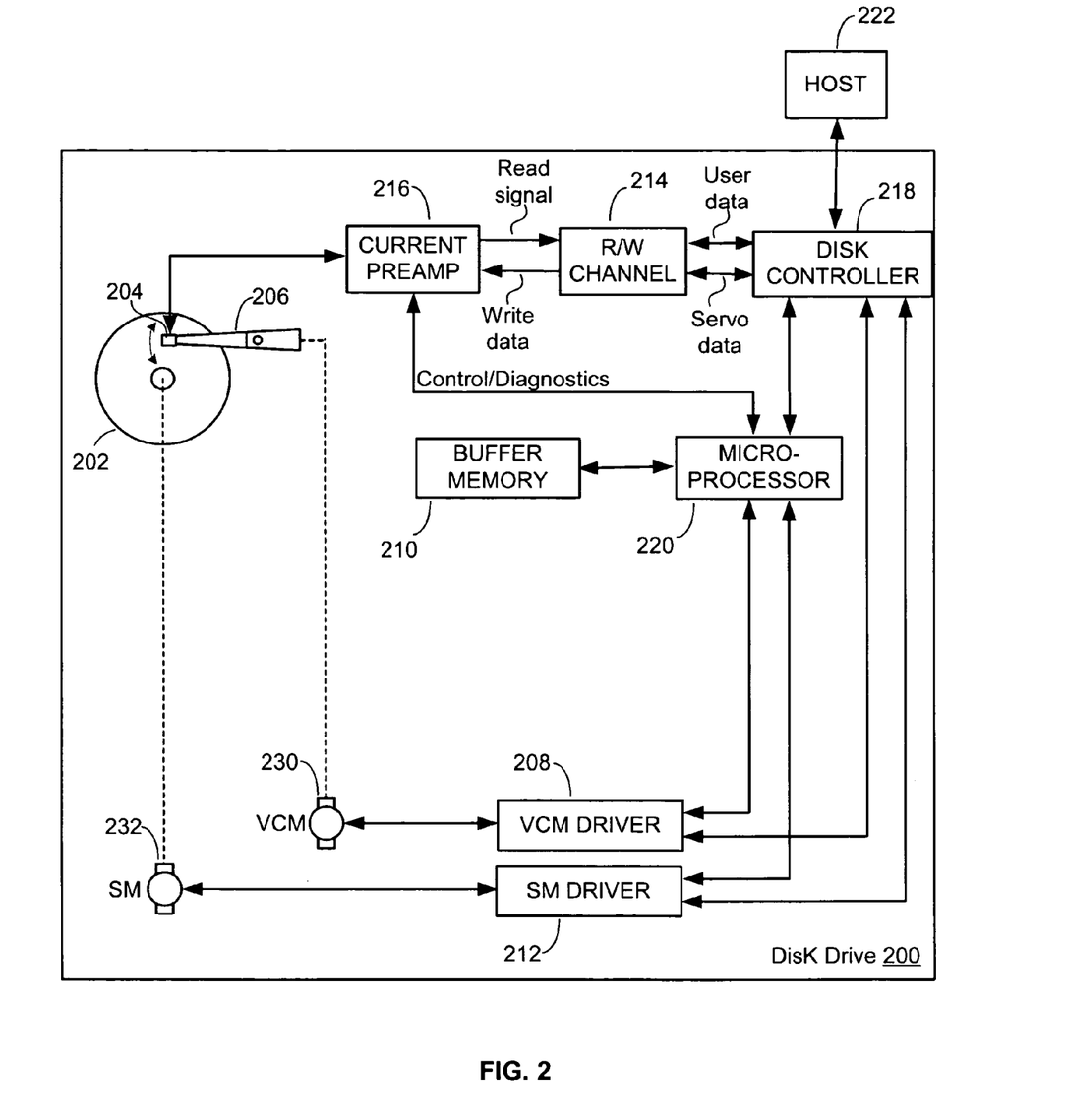
FIG. 2 is a high level diagram of an exemplary disk drive.

An exemplary disk drive 200, as shown in FIG. 2, includes at least one disk 202 capable of storing information on at least one of the surfaces of the disk. A closed-loop servo system can be used to move an actuator arm 206 and read/write head 204 over the surface of the disk, such that information can be written to, and read from, the surface of the disk. The closed-loop servo system can include, for example, a voice coil motor (VCM) driver 208 to drive current through a voice coil motor (VCM) 230 in order to drive the actuator arm 206, a spindle motor (SM) driver 212 to drive current through a spindle motor (SM) 132 in order to rotate the disk(s) 202, a microprocessor 220 to control the motor drivers, and a disk controller 218 to transfer information between the microprocessor 220, buffer memory 210, read/write channel 214, and a host 222. The host 222 can be any device, apparatus, or system capable of utilizing the disk driver 200, such as, but not limited to, a personal computer or Web server or consumer electronics device. The drive 200 can contain at least one processor, or microprocessor 220, that can process information for the disk controller 218, read/write channel 214, VCM driver 208 and/or SM driver 212. The microprocessor can also include a servo controller, which can exist as an algorithm resident in the microprocessor 220. The disk controller 218, which can store information in buffer memory 210 resident in the drive, can also provide user data to a read/write channel 214, which can send data signals to a current amplifier (also known as a preamp) 216 to be written to the disk(s) 202, and can send servo and/or user data signals back to the disk controller 218.

While FIG. 2 illustrates the general components of a typical disk drive, it should be understood that multiple disks 202 can be mounted in a common stack for rotation in unison upon operation of the single spindle motor 232, and further that multiple read/write heads 204 may be provided on separate arms 206 of a multi-armed actuator assembly for positioning the various heads 204 in close relation with respective upper and lower surfaces of the multiple disks 202. In such a multi-disk disk drive construction, the several heads 204 are displaced in unison through radial traverses relative to the multiple disks 202, with the one of the heads 204 being operational at any given time for purposes of reading and/or writing data. It is noted that the one or more actuator arm 206 and the VCM 230 are often referred to as being part of an actuator assembly, which also includes additional components that need not be described herein.

An exemplary disk 202 includes a central opening to enable a rotating hub to securely clamp the disk to a disk spindle. Between an inner area and an outer peripheral area of the disk is a data storage area where a multiplicity of concentric data tracks are defined. The tracks are typically arranged into multiple data zones (also known as data fields or user data fields), from a radially outermost data zone to a radially innermost data zone. A system information region and a diagnostics and guard region typically lies near the inner diameter and/or outer diameter of the disk, outside the data storage area. The disk typically also includes a series of radially extending servo sectors (also known as servo fields or servo wedges), which are typically equally spaced around the circumference of the disk. While the number of data sectors in each zone varies, the number of embedded servo wedges typically remains invariant throughout the extent of the storage surface. As each data sector is typically of fixed storage capacity or length (e.g. 512 bytes of user data per data sector), and since the density and data rates may vary from data zone to data zone, the servo sectors may interrupt and split up at least some of the data sectors. The servo sectors are typically recorded with a servo writing apparatus at the factory, but may be written (or partially written) by a self-servowriting operation.

Each servo wedge is formed by a number of subpart fields, which typically includes a preamble, a servo address mark ("SAM"), a wedge number, a track number code and a number of off-track bursts. The preamble is a series of magnetic transitions which represents the start of the servo field. A signal produced while reading the preamble can be used to adjust an automatic gain control (AGC) and/or a phase lock loop (PLL) of a servo demodulator, to allow demodulation of the rest of the servo wedge. The SAM, which specifies the beginning of available information from the servo wedge, is typically used to resynchronize timer(s) for recovering the head position and the track/data identification field information, and to mark in time the expected arrival of the next servo wedge. The wedge number (which may simply be an index mark), is used to count the number of servo fields in each track when the disk is rotating. A different wedge number can uniquely identify each servo wedge. Alternatively, if the wedge number is simply an index mark, the wedge number can be, for example, a data bit "one" for an index servo wedge, and a data bit "zero" for all other servo wedges. The term wedge number is also meant to cover other numbers or marks that are used to indicate the rotational position of a disk, relative to a head. The track number, which is usually gray coded, is used for uniquely identifying each track. The off-track burst patterns are employed to control the fine positioning of a read/write head relative to the tracks.

In operation, the disk controller 218 typically receives a command signal from the host 222 which indicates that a certain portion of a disk 202 is to be accessed. In response to the command signal, the disk controller 218 provides the microprocessor 220 with a position signal which indicates a particular track over which the actuator assembly is to position the head 204. The microprocessor 220 performs a seek operation in response to receiving the position signal.

Exemplary Seek Controller

Figure 3:
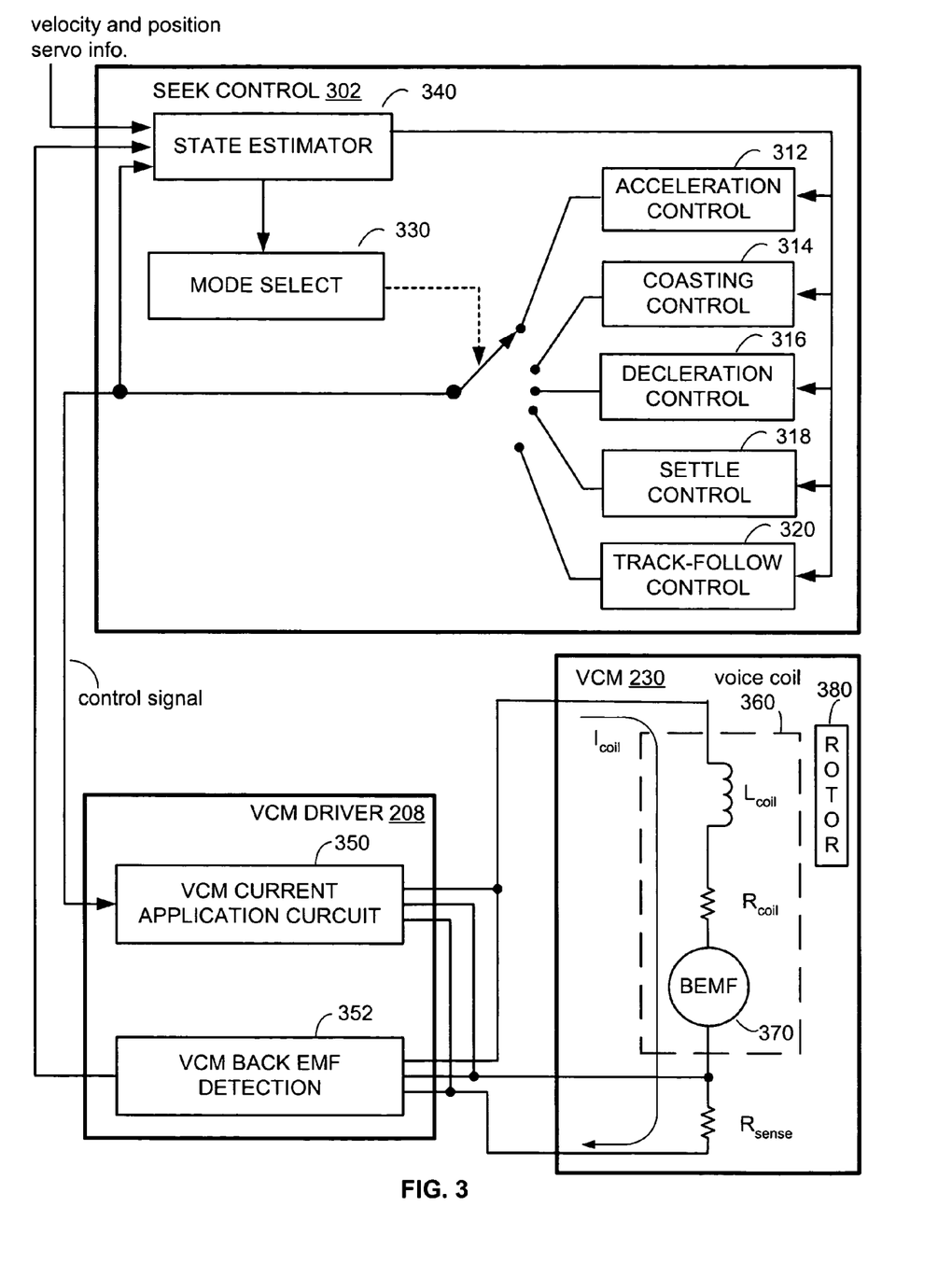
FIG. 3 is a high level diagram of an exemplary seek controller of a disk drive.

FIG. 3 illustrates an exemplary seek controller 302, which can be implemented by the microprocessor 210, the disk controller 218, or combinations thereof. It is also possible that the seek controller 302 be implemented by a dedicated microcontroller that includes its own processor. In addition to controlling seek operations, such a dedicated microprocessor will also likely perform other servo control operations.

The exemplary seek controller 302 is shown as including sub-controllers, including an acceleration controller 312, a coasting controller 314, a deceleration controller 316, a settle controller 318 and a track-following controller 320. The acceleration controller 312 controls the actuator assembly during the acceleration phase of a seek operation, the coasting controller 314 controls the actuator assembly during the coasting phase of a seek operation, the deceleration controller controls the actuator assembly during the deceleration phase of a seek operation, and so on. While each of the sub-controllers and other components of the seek controller are shown as a separate functional block, it is likely that such blocks only exists as modules of code, and are thus not physically separate components.

The seek controller 302 is also shown as including a state estimator block 340 and a mode select bock 330. The state estimator block 340 is useful for determining (e.g., estimating) the present velocity and present position of the head, in any well known manner. Information useful for determining the present velocity and present position may be received from a servo demodulator (e.g., implemented within the microprocessor 220) and/or from the VCM back electromagnetic field (BEMF) detection block 352.

The mode select block 330 uses the present velocity and present position information to select which seek subcontroller 312–320 should be used to control the actuator assembly during various phases of the seek operation. For example, the mode select block 330 will typically first select the acceleration controller 312 during the beginning of a seek operation, followed by the coasting controller 314. When the head gets within a certain distance of the desired position, the mode selector 330 will then select the deceleration controller 316, and eventually hand-off control of the actuator assembly to the settle controller 318 when the head gets very close to the desired position. Once the head is positioned over the desired track, the track-follow controller 320 will be given control.

FIG. 3 also shows exemplary details of the VCM driver 208 of FIG. 2 as connected to the VCM 230. As shown, the exemplary VCM driver 208 includes a VCM current application circuit 350, which applies current to a coil 360 of the VCM 230 with a duration and magnitude controlled based on a control signal received from the seek controller 302 (e.g., implemented in microprocessor 220). The coil 360 is modeled in FIG. 3 to include a coil inductance Lcoil, a coil resistance Rcoil and a BEMF voltage generator 370. Current provided through the coil 360 controls movement of a rotor 380 associated with the actuator arm 206, and likewise movement of the rotor 380 generates a BEMF voltage in the BEMF voltage generator 370.

The VCM driver 208 further includes a BEMF detection circuit 352 for sensing the velocity of the actuator arm 206 (and thus the velocity of the head 204) based on an estimate of the open-circuit voltage of the VCM 230. The open-circuit voltage of the VCM 230 can be estimated by observation of the actual VCM voltage and the VCM current (either the commanded current or the sensed current, sensed using a series sense resistor Rsense), and multiplication of the current by an estimated VCM coil resistance (Rcoil) and subtraction of that amount from the measured coil voltage. Velocity is typically only estimated using the BEMF detection circuit 352 during startup or shutdown. Otherwise, it is typically more accurate to estimate velocity based on the servo information read from the servo wedges, as is well known in the art.

As mentioned above, each servo wedge typically includes a track number as well as other servo information. When a disk drive is performing a seek operation, the read/write head 204 is typically used to read the track number of every servo wedge that passes under the head 204. From this information (and possibly additional information obtained using position sensors, and the like), the state estimator 340 can determine (e.g., estimate) the present position and present velocity of the data read/write head(s), in any of many available manners.

Embodiments of the present invention could also be used with disk drives that include a disk 202 having a surface that is dedicated to servo information. In a similar fashion, the servo information read by the head 204 that reads the servo information from the dedicated disk surface can be used to determine the present position and velocity of the data read/write head(s).

It is also noted that the embodiments of the present invention could also be used with a disk drive that uses removable rather than fix media.

It is further noted that the embodiments of the present invention could also be used with optical disk drives such as, but not limited to, a CD or DVD reader/writer. In the case of an optical drive, the read/write head is an optical pickup unit (OPU). In optical drives absolute position is not read during the seek operation. Rather, the relative position error is computed by counting tracks as the OPU moves across the disk. Since embodiments of the present invention rely on the relative position and velocity of the head (which can be an OPU, as just mentioned), such embodiments are equally applicable to optical drives.

Now that an exemplary disk drive 200 and an exemplary seek controller 302 have been described, embodiments of the present invention will now be described in more detail below.

Deceleration Control

Rather than controlling velocity in an effort to keep the read/write head on a single predetermined phase space deceleration profile, as is done with PTOS type algorithms (described above in the Background section), embodiments of the present invention treat velocity control as an "end-point boundary value problem." Stated another way, with embodiments of the present invention, each time a new present velocity/position of a read/write head is determined (e.g., at each sample time or track crossing), rather than adjusting the velocity to try to get the head back to a previously determined desired deceleration profile (as was explained with reference to FIG. 1), there is a new determination of a preferred way to get the head from its new present velocity/position to the desired position.

A good way to explain the concept of treating a problem as an "end-point boundary value problem" is with an analogy that relates to a person following detailed driving directions to drive their automobile from a starting position to a desired destination position. More specifically, assume the person is following detailed directions that set out the best way for them to drive from their house to the market. Now assume that the directions instructed the person to turn left at Main Street, but the person accidentally turned right at Main Street. Using a prior art PTOS type algorithm, the person would turn-around and return to the intersection at which they made the wrong turn, and then make the correct right turn at Main Street. This, however, may not be the most efficient way for the person to get to the market after the initial wrong turn occurred. Rather, it may be more efficient to select (e.g., determine on-the-fly) a new best way to get from the present position (after the wrong turn was made) to the market. In a similar manner, when a read/write head strays from an initially determined deceleration profile, it may be more efficient for the read/write head to begin to follow a new deceleration profile, rather than try to get back to the initial profile. Accordingly, in embodiments of the present invention, when a new velocity/position is determined for a read/write head, a new phase space deceleration curve is selected, in an effort to get the read/write head to the desired position in a more efficient manner.

Embodiments of the present invention will new be described with reference to the following algorithms.

If a maximum deceleration voltage is applied to the VCM 230 (which is used to move the read/write head 204 through rotation of the actuator arm 206), then the deceleration rate (a) will be given by:

$$a = a_0 - K \cdot v \quad \text{(Equation 1)}$$

where, a is the deceleration when the maximum deceleration voltage is applied to the VCM 230, $a_0$ is the deceleration associated with the predetermined stall current of the VCM 230 (referring back to FIG. 3, the stall current is the current that flows through the voice coil 360 when the maximum deceleration voltage, e.g. ~5V, is applied across the voice coil 360 while the rotor 380 is prevented from moving), K is the back electromagnetic field (BEMF) constant of the VCM 230 expressed in units of acceleration/velocity, and v is the velocity of the VCM 230 (and thus, the velocity of the head 204).

In accordance with embodiments of the present invention, the boundary value control problem can be solved with the constraint that the deceleration be of the form:

$$a = f \cdot (a_0 - K \cdot v) \quad \text{(Equation 2)}$$

where, f is a number less than 1, i.e. a fraction of the maximum possible deceleration control.

This reduces the control problem to that of choosing a value for the fraction f.

By letting x be the head position, and v the head velocity (as mentioned above), if the desired end-point is x=0 and v=0, and the deceleration profile has the form of Equation 2, then for any given value of f, the position, x, and the velocity, v, can be shown to be related by the following equation:

$$f \cdot x = -\frac{v}{K} - \frac{a_0}{K^2} \ln\left(1 - \frac{K \cdot v}{a_0}\right) \quad \text{(Equation 3)}$$
$$= h(v)$$

Figure 4:
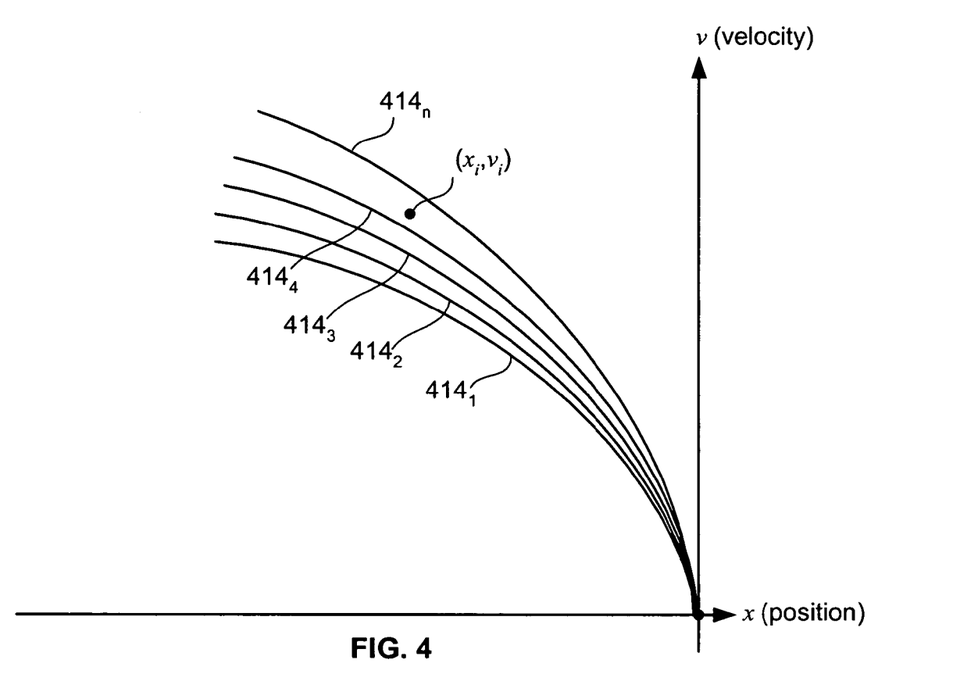
FIG. 4 is a phase space diagram that is useful for describing embodiments of the present invention.

Equation 3 describes a family of curves (i.e., deceleration profiles) in phase space, examples of which are shown in FIG. 4. Referring to FIG. 4, each deceleration profile $414_1$, $414_2$, $414_3$ ... $414_n$ is for a different control fraction f.

In accordance with an embodiment of the present invention, at each sample time during deceleration, the present position and the present velocity $(x_i, v_i)$ are determined, which corresponds to a point in phase space, as shown in FIG. 4. Then, using Equation 3, there is a determination as to on which deceleration profile the present position/velocity $(x_i, v_i)$ lies. In other words, Equation 3 is used to solve for the control fraction f, so that a deceleration profile can be selected. If, for example, the seek controller accelerates the head to a point in phase space when f=0.9 before switching to deceleration control, then the head will tend to stay on that curve to the origin.

From Equation 3, the control fraction f is given by the following equation:

$$f = \frac{h(v_i)}{x_i} \quad \text{(Equation 4)}$$

Combining Equations 2 and 4, the deceleration $a_i$ that is used at each sample time i to drive the read/write head to the origin $(x_0, v_0)$ is as follows:

$$a_i = \frac{h(v_i)}{x_i}(a_0 - K \cdot v_i) \quad \text{(Equation 5)}$$

It is noted that since $a_0$ and K are known, and h(v) is independent of the control fraction f, then h(v) can be pre-computed and stored for later use (e.g., in a table). Accordingly, even though it can be, h(v) does not need to be computed "on-the-fly" during deceleration.

It is standard practice to switch from a deceleration controller to a settle controller as the head approaches the origin in phase space. More specifically, the settle controller is typically designed to bring the head from a pre-defined "hand-off" point (in phase space) to the origin (i.e., the desired position). However, the set of deceleration profiles shown in FIG. 4 may not bring the head to a convenient point in phase space where a smooth hand-off can occur from the deceleration controller to the settle controller. Thus, in accordance with an embodiment of the present invention, the desired end-point is changed from the origin to a different target point in phase space, $(x,v)=(x_T, v_T)$, where the hand-off is more convenient. This results in a new family of curves (i.e., deceleration profiles) in phase space, which can be described as follows:

$$f \cdot (x - x_T) = h(v) - h(v_T) \quad \text{(Equation 6)}$$

Figure 5:
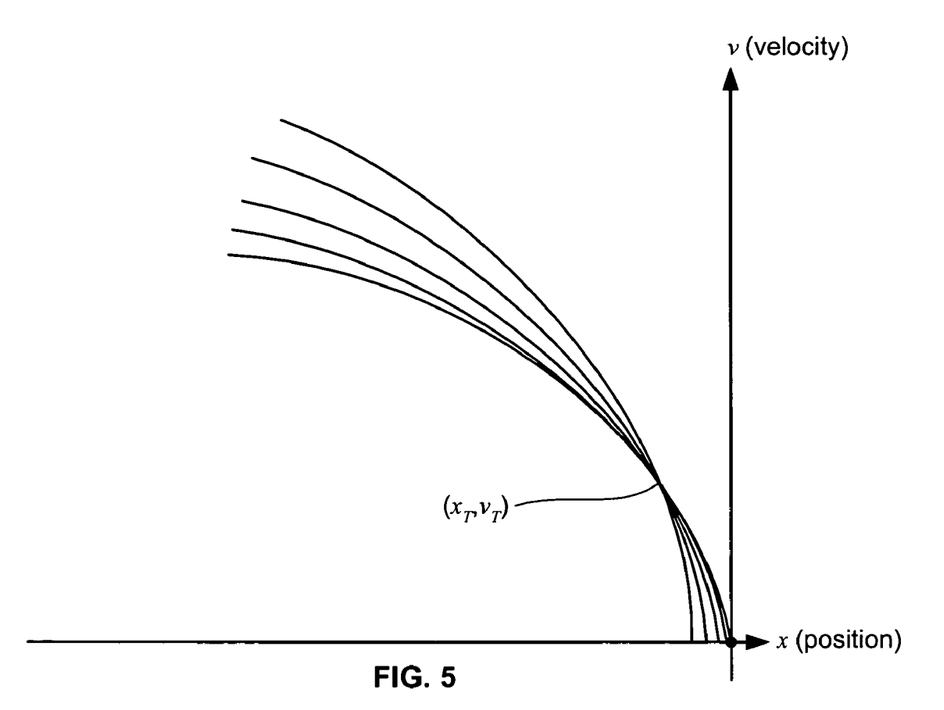
FIG. 5 is a further phase space diagram that is useful for describing further embodiments of the present invention.

The set of deceleration profiles defined using Equation 6 all pass through a "target point" $(x_T, v_T)$ in phase space that is offset from the origin (i.e., offset from the desired position in x and from 0 in v). FIG. 5 shows an exemplary family of deceleration profiles in phase space, where the target point is not the origin, but rather a point offset from the origin where a smooth and convenient hand-off from the deceleration controller to the settle controller can occur. Combining Equations 2 and 6, the deceleration $a_i$ that can be applied to get the read/write head to the target point $(x_T, v_T)$ is as follows:

$$a_i = \frac{h(v_i) - h(v_T)}{x_i - x_T}(a_0 - K \cdot v_i) \quad \text{(Equation 7)}$$

Figure 6:
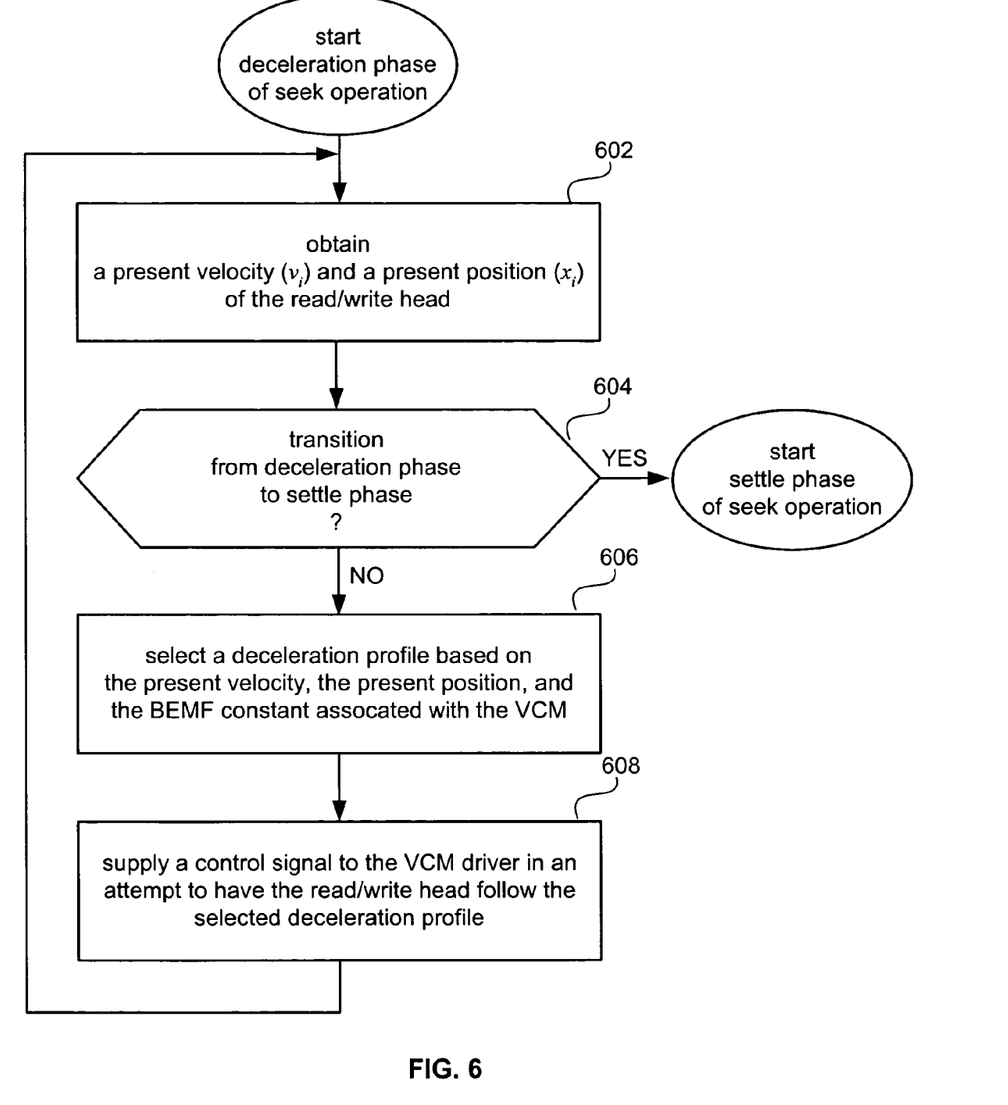
FIG. 6 is a high level flow diagram that is useful for summarizing embodiments of the present invention.

Embodiments of the present invention will now be summarized with reference to the flow diagram of FIG. 6.

Referring briefly back to FIG. 2, embodiments of the present invention are useful in a disk drive system that includes a read/write head 204, an actuator assembly including a VCM 230, and a VCM driver 208 that drives the VCM 230. Such a VCM 230 has an associated back electromagnetic field (BEMF) constant, which can be measured beforehand. Embodiments of the present invention encompass those situations where it is assumed that the BEMF constant is the same across the stroke of the drive, as well as those situations where the BEMF constant is determined for various positions across the stroke.

Referring specifically to FIG. 6, embodiments of the present invention relate to controlling the deceleration phase of a seek operation that is used to move the read/write head 204 to a desired velocity and a desired position in phase space, where the read/write head will either read data or write data.

At a step 602, a present velocity ($v_i$) and a present position ($x_i$) of the read/write head is obtained in any available manner (e.g., in any presently known or future developed manner). For example, as explained above, the present velocity and/or the present position may be estimations, e.g., determined by the state estimator 340. The determinations/estimations performed by the state estimator 340 can be based on demodulated servo information and/or information obtained from the BEMF detection block 352 (see FIG. 3). However, it is noted that embodiments of the present invention are not intended to be limited to any specific manner in which the present velocity and present position are obtained.

Although not required, in accordance with embodiments of the present invention, each present position ($x_i$) may be expressed in terms of a position error from the desired position, and each present velocity ($v_i$) may be expressed in terms of a velocity error from the desired velocity. As mentioned above, the desired velocity and the desired position is the point in phase space where the read/write head will either read data or write data. In many embodiments of the present invention the velocity at the desired position (i.e., the desired velocity) is zero. Thus, if the desired velocity (at the desire position) is zero, then a present velocity would be precisely equal to the velocity error (from the desired velocity).

It is shown at a next step 604 that there is a check to see whether there should be a transition from the deceleration phase to the settle phase, which as mentioned above is used when the read/write head gets very close to the desired position. Typically, this determination is based on whether the read/write head is within a specific distance and/or velocity of the desired position and velocity. The specific manner that this determination is performed is not important to the present invention. Rather, step 604 has only been included for the purpose of showing that the seek operation will eventually transition from the deceleration phase to a settle phase.

At a step 606, a deceleration profile is selected based on the present velocity, the present position and the BEMF constant associated with the VCM 230, wherein the deceleration profile defines a path in phase space from the present velocity and the present position to the desired velocity and the desired position. As mentioned above, it can be assumed that the BEMF constant is the same across the entire stroke of the drive. Alternatively, there can be a different BEMF constant for the various positions across the stroke. Step 606 is meant to encompass using the same BEMF constant regardless of the position along the stroke, or using the specific BEMF constant corresponding to the present position along the stroke. Additionally, it is noted that the term "based on," as used herein, is open ended in that it means "based at least in part on," unless otherwise specified. For example, selecting a deceleration profile based on the present velocity, the present position and the BEMF constant associated with the VCM 230 means that the selection of a deceleration profile may also take into account other attributes in addition to those specifically mentioned.

Each deceleration profile will generally have the form of Equation 2. More specifically, in accordance with specific embodiments of the present invention the deceleration profile is selected by solving for f using Equation 4. As explained above, f is a fraction of the predetermined maximum possible deceleration control, with each different value for f corresponding to a different deceleration profile. Once f is solved for, the selected deceleration profile will generally have the form of Equation 5.

Next, at a step 608, a control signal is provided to the VCM driver 208 in an attempt to have the read/write head follow the selected deceleration profile. In accordance with an embodiment of the present invention, such a control signal will be a function of the selected deceleration profile, the present velocity, the present position and the BEMF constant, e.g., as is apparent from Equation 5.

Flow then returns to step 602 so that steps 602–608 can be repeated until the read/write head is sufficiently close to the desired velocity and desired position that there is a transition from the deceleration phase to the settle phase of the seek operation (e.g., at step 604). Each time step 602 is repeated a new present velocity and a new present position is obtained. Each time step 606 is repeated a new deceleration profile is selected based on the new present velocity most recently obtained at step 602, the new present position most recently obtained at step 602, and the BEMF constant (which may or may not be dependent on the present position along the stroke). Additionally, each time that step 608 is repeated the control signal is supplied to the VCM driver 208 in an attempt to have the read/write head 202 follow the new deceleration profile most recently selected at step 606.

Although not likely, if the new present velocity and the new present position most recently obtained at step 602 lie on a previously selected deceleration profile, then the new deceleration profile most recently selected at step 606 can be the same as the previously selected deceleration profile.

As was explained above during the discussion of FIG. 5 and Equations 6 and 7, in accordance with alternative embodiments of the present invention, deceleration curves can be used to move the read/write head 202 to a target velocity and target position that are offset from the desired velocity and the desired position. The flow diagram for these alternative embodiments would be essentially the same as the diagram of FIG. 6, and thus a separate flow diagram is not included. The main difference would be that the deceleration profiles selected at step 606 would each define a path in phase space from the present velocity and present position to a target velocity and a target position where it is useful to switch from the deceleration phase to a settling phase of the seek operation, wherein the target velocity and the target position are offset, respectively, from the desired velocity and the desired position. Then, when the present velocity and the present position, respectively, are substantially equal to the target position and the target velocity, the seek operation would transition from the deceleration phase to the settle phase.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. For use in a disk drive system including a read/write head, an actuator assembly including a voice coil motor (VCM) that is used to control movement of the read/write head, and a VCM driver that drives the VCM, wherein the VCM has an associated back electromagnetic field (BEMF) constant, a method for controlling the deceleration phase of a seek operation that is used to move the read/write head to a desired velocity and a desired position in phase space, the method comprising:

(a) obtaining a present ($v_i$) and a present position ($x_i$) of the read/write head;

(b) selecting a deceleration profile, based on the present velocity ($v_i$), the present position ($x_i$) and the BEMF constant, wherein the deceleration profile defines a path in phase space from the present velocity and present position to a target velocity and a target position where it is useful to switch from the deceleration phase to a settling phase of the seek operation, rather than defining a path in phase space from the present velocity and present position to the desired velocity and the desired position, wherein the target velocity and the target position are offset, respectively, from the desired velocity and the desired position; and (c) supplying a control signal to the VCM driver in an attempt to have the read/write head follow the selected deceleration profile.

2. The method of claim 1, wherein:

each present position ($x_i$) is expressed in terms of a position error from the desired position; and each present velocity ($v_i$) is expressed in terms of a velocity error from the desired velocity.

3. The method of claim 1, wherein each deceleration profile is generally of the form $$a = f \cdot (a_0 - K \cdot v)$$

where, a represents a deceleration;

f is a fraction of a predetermined maximum possible deceleration control;

$a_0$ is a predetermined deceleration associated with a stall current of the VCM;

K is a predetermined BEMF constant of the VCM; and v is a velocity of the VCM.

4. The method of claim 3, wherein:

each different value for f corresponds to a different deceleration profile; and each of the different deceleration profiles intersect one another at a point in phase space representing the target velocity and the target position.

5. The method of claim 4, wherein step (b) includes solving for f.

6. The method of claim 5, wherein step (b) includes solving for f in accordance with the following equation $$f = \frac{h(v_i) - h(v_\tau)}{x_i - x_\tau}$$

where $$h(v_i) = -\frac{v_i}{K} - \frac{a_0}{K^2} \ln\left(1 - \frac{K \cdot v_\tau}{a_0}\right);$$

$v_i$ is the present velocity;

$x_i$ is the present position;

$$h(v_\tau) = -\frac{v_\tau}{K} - \frac{a_0}{K^2} \ln\left(1 - \frac{K \cdot v_\tau}{a_0}\right);$$

$v_T$ is the target velocity, which is offset from the desired velocity; and $x_T$ is the target position, which is offset from the desired position.

7. The method of claim 6, wherein, once f is solved for, the selected deceleration profile generally has the form $$a_i = \frac{h(v_i) - h(v_T)}{x_i - x_T}(a_0 - K \cdot v_i).$$

8. The method of claim 6, wherein step (b) includes determining $h(v_i)$ and $h(v_T)$ on-the-fly.

9. The method of claim 6, wherein values for $h(v_i)$ and $h(v_T)$ that correspond to numerous possible velocities and numerous possible positions that are pre-computed and stored.

10. The method of claim 9, wherein step (b) includes solving for f using the stored values for $h(v_i)$ and $h(v_T)$.

11. The method of claim 1, further comprising repeating steps (a) through (c) at later points in time during the same deceleration phase of the same seek operation, wherein:
    each time step (a) is repeated a new present velocity and a new present position is obtained;
    each time step (b) is repeated a new deceleration profile is selected based on the new present velocity most recently obtained at step (a), the new present position most recently obtained at step (a), and the BEMF constant; and
    each time step (c) is repeated the control signal is supplied to the VCM driver in an attempt to have the read/write head follow the new deceleration profile most recently selected at step (b).

12. The method of claim 11, wherein the new deceleration profile most recently selected at step (b) can be the same as a previously selected deceleration profile if the new present velocity and the new present position most recently obtained at step (a) lie on the previously selected deceleration profile.

13. The method of claim 11, wherein steps (a) through (c) are repeated until the present position and the present velocity, respectively, are substantially equal to the target position and the target velocity, at which point the seek operation transition from the deceleration phase to the settling phase.

14. The method of claim 11, wherein:
    each present position ($x_i$) is expressed in terms of a position error from the desired position; and
    each present velocity ($v_i$) is expressed in terms of a velocity error from the desired velocity.

15. The method of claim 11, wherein each deceleration profile is generally of the form $$a = f \cdot (a_0 - K \cdot v)$$

where,
a represents a deceleration;
f is a fraction of a predetermined maximum possible deceleration control;
$a_0$ is a predetermined deceleration associated with a stall current of the VCM;
K is a predetermined BEMF constant of the VCM; and
v is a velocity of the VCM.

16. The method of claim 15, wherein:
    each different value for f corresponds to a different deceleration profile; and
    each of the different deceleration profiles intersect one another at a point in phase space representing the target velocity and the target position.

17. The method of claim 16, wherein step (b) includes solving for f.

18. The method of claim 17, wherein step (b) includes solving for f in accordance with the following equation $$f = \frac{h(v_i) - h(v_T)}{x_i - x_T}$$

where $$h(v_i) = -\frac{v_i}{K} - \frac{a_0}{K^2}\ln\left(1 - \frac{K \cdot v_T}{a_0}\right);$$

$v_i$ is the present velocity;
$x_i$ is the present position;

$$h(v_T) = -\frac{v_T}{K} - \frac{a_0}{K^2}\ln\left(1 - \frac{K \cdot v_T}{a_0}\right);$$

$v_T$ is the target velocity, which is offset from the desired velocity; and
$x_T$ is the target position, which is offset from the desired position.

19. The method of claim 18, wherein, once f is solved for, the selected deceleration profile generally has the form $$a_i = \frac{h(v_i) - h(v_T)}{x_i - x_T}(a_0 - K \cdot v_i).$$

20. The method of claim 18, wherein step (b) includes determining $h(v_i)$ and $h(v_T)$ on-the-fly.

21. The method of claim 18, wherein values for $h(v_i)$ and $h(v_T)$ that correspond to numerous possible velocities and numerous possible positions that are pre-computed and stored.

22. The method of claim 21, wherein step (b) includes solving for f using the stored values for $h(v_i)$ and $h(v_T)$.

23. The method of claim 1, wherein the BEMF constant can differ for different positions along a stroke of the drive, and wherein the BEMF constant used for selecting the deceleration profile in step (b) is a predetermined BEMF constant corresponding to the present position.

24. For use in a disk drive system including a read/write head, an actuator assembly including a voice coil motor (VCM) that is used to control movement of the read/write head, and a VCM driver that drives the VCM, wherein the VCM has an associated back electromagnetic field (BEMF) constant,
    a method for controlling the deceleration phase of a seek operation that is used to move the read/write head to a desired velocity and a desired position in phase space, the method comprising:
    (a) obtaining a present velocity ($v_i$) and a present position ($x_i$) of the read/write head;
    (b) selecting a deceleration profile, based on the present velocity ($v_i$), the present position ($x_i$) and the BEMF constant,
    wherein the deceleration profile defines a path in phase space from the present velocity and present position to a target velocity and a target position where it is useful to switch from the deceleration phase to a settling phase of the seek operation, rather than defining a path in phase space from the present velocity and present position to the desired velocity and the desired position,
wherein the target velocity and the target position are offset, respectively, from the desired velocity and the desired position; and (c) supplying a control signal to the VCM driver, wherein the control signal is a function of the selected deceleration profile, the present velocity, the present position and the BEMF constant.

25. The method of claim 24, wherein the BEMF constant can differ for different positions along a stroke of the drive, and wherein the BEMF constant used for selecting the deceleration profile in step (b) is a predetermined BEMF constant corresponding to the present position.

26. The method of claim 24, further comprising repeating steps (a) through (c) at later points in time during the same deceleration phase of the same seek operation, wherein:
each time step (a) is repeated a new present velocity and a new present position is obtained;
each time step (b) is repeated a new deceleration profile is selected based on the new present velocity most recently obtained at step (a), the new present position most recently obtained at step (a), and the BEMF constant; and
each time step (c) is repeated the control signal is supplied to the VCM driver in an attempt to have the read/write head follow the new deceleration profile most recently selected at step (b).

27. The method of claim 26, wherein steps (a) through (c) are repeated until the seek operation transitions from the deceleration phase to the settling phase.

28. A method for moving a read/write head to a target point in phase where it is efficient to hand-off of a seek operation from a deceleration controller to a seek controller, the method comprising:
(a) obtaining a present velocity ($v_i$) and a present position ($x_i$) of the read/write head;
(b) selecting a deceleration profile that can be used to move the read/write head from the present velocity and the present position to a target velocity and a target position that are offset, respectively, from the desired velocity and the desired position, rather than selecting a deceleration profile that can be used to move the read/write head from the present velocity and present position to the desired velocity and the desired position; and
(c) using the selected deceleration profile to control movement of the read/write head toward the target velocity and the target position;
wherein the target velocity and the target position correspond to the target point in phase space where it is efficient to hand-off control of the seek operation from the deceleration controller to the seek controller.

29. The method of claim 28, further comprising repeating steps (a) through (c) at later points in time during the same seek operation, wherein:
each time step (a) is repeated a new present velocity and a new present position is obtained;
each time step (b) is repeated a new deceleration profile is selected based on the new present velocity most recently obtained at step (a) and the new present position most recently obtained at step (a); and
each time step (c) is repeated the selected deceleration profile most recently selected at step (b) is used to control movement of the read/write head.

30. The method of claim 29, wherein each deceleration profile is generally of the form $$a = f \cdot (a_0 - K \cdot v)$$

where,
a represents a deceleration;
f is a fraction of a predetermined maximum possible deceleration control;
$a_0$ is a predetermined deceleration associated with a stall current of a voice coil motor (VCM) that is used to control movement of the read/write head;
K is a predetermined BEMF constant of the VCM; and
v is a velocity of the VCM.

31. A disk drive system, comprising:
a rotatable disk including at least one surface to store information;
a read/write head to read form and write to the disk;
an actuator assembly including a voice coil motor (VCM) that is used to control movement of the read/write head, wherein the VCM has an associated back electromagnetic field (BEMF) constant;
a VCM driver to drive the VCM; and
a deceleration controller to control a deceleration phase of a seek operation that is used to move the read/write head to a desired velocity and a desired position in phase space,
wherein the deceleration controller is configured to select a deceleration profile, based on a present velocity ($v_i$) and a present position ($x_i$) of the read/write head and the BEMF constant,
wherein the deceleration profile defined a path in phase space from the present velocity and present position to a target velocity and a target position where it is useful to switch from the deceleration phase to a settling phase of the seek operation, rather than defining a path in phase space from the present velocity and present position to the desired velocity and the desired position,
wherein the target velocity and the target position are offset, respectively, from the desired velocity and the desired position; and
wherein the deceleration controller is further configured to supply a control signal to the VCM driver in an attempt to have the read/write head follow the selected deceleration profile.

32. The system of claim 31, wherein:
each present position ($x_i$) is expressed in terms of a position error from the desired position; and
each present velocity ($v_i$) is expressed in terms of a velocity error from the desired velocity.

33. The system of claim 31, wherein each deceleration profile is generally of the form $$a = f \cdot (a_0 - K \cdot v)$$

where,
a represents a deceleration;
f is a fraction of a predetermined maximum possible deceleration control;
$a_0$ is a predetermined deceleration associated with a stall current of the VCM;
K is a predetermined BEMF constant of the VCM; and
v is a velocity of the VCM.

34. The system of claim 33, wherein:
each different value for f corresponds to a different deceleration profile; and
each of the different deceleration profiles intersect one another at a point in phase space representing the target velocity and the target position.

35. The system of claim 34, wherein the deceleration controller is configured to solve for f.

36. The system of claim 35, wherein the deceleration controller is configured to solve for f in accordance with the following equation $$f = \frac{h(v_i) - h(v_\tau)}{x_i - x_\tau}$$

where $$h(v_i) = -\frac{v_i}{K} - \frac{a_0}{K^2}\ln\left(1 - \frac{K \cdot v_\tau}{a_0}\right);$$

$v_i$ is the present velocity;
$x_i$ is the present position;

$$h(v_\tau) = -\frac{v_\tau}{K} - \frac{a_0}{K^2}\ln\left(1 - \frac{K \cdot v_\tau}{a_0}\right);$$

$v_T$ is the target velocity, which is offset from the desired velocity; and
$x_T$ is the target position, which is offset from the desired position.

37. The system of claim 36, wherein, once f is solved for, the selected deceleration profile generally has the form $$a_i = \frac{h(v_i) - h(v_\tau)}{x_i - x_\tau}(a_0 - K \cdot v_i).$$

38. The system of claim 36, wherein the deceleration controller is configured to determine $h(v_i)$ and $h(v_T)$ on-the-fly.

39. The system of claim 36, wherein values for $h(v_i)$ and $h(v_T)$ that correspond to numerous possible velocities and numerous possible positions are pre-computed and stored.

40. The system of claim 39, wherein the deceleration controller is configured to solve for f using the stored values for $h(v_i)$ and $h(v_T)$.

41. The system of claim 31, wherein the deceleration controller is configured to:
select a new deceleration profile each time a new present velocity and a new present position are obtained during the same deceleration phase of the same seek operation; and
supply a control signal to the VCM driver in an attempt to have the read/write head follow the new selected deceleration profile.

42. The system of claim 41, wherein the new selected deceleration profile can be the same as a previously selected deceleration profile if the new present velocity and the new present position lie on the previously selected deceleration profile.

43. The system of claim 41, wherein control of a seek operation is transferred from the deceleration controller to a settle controller when a predetermined condition is satisfied.

44. The system of claim 41, wherein:
each present position ($x_i$) is expressed in terms of a position error from the desired position; and
each present velocity ($v_i$) is expressed in terms of a velocity error from the desired velocity.

45. The system of claim 41, wherein each deceleration profile is generally of the form $$a = f \cdot (a_0 - K \cdot v)$$

where,
a represents a deceleration;
f is a fraction of a predetermined maximum possible deceleration control;
$a_0$ is a predetermined deceleration associated with a stall current of the VCM;
K is a predetermined BEMF constant of the VCM; and
v is a velocity of the VCM.

46. The system of claim 45, wherein:
each different value for f corresponds to a different deceleration profile; and
each of the different deceleration profiles intersect one another at a point in phase space representing the target velocity and the target position.

47. The system of claim 46, wherein the deceleration controller is configured to solve for f.

48. The system of claim 46, wherein the deceleration controller is configured to solve for f in accordance with the following equation $$f = \frac{h(v_i)}{x_i}$$

where $$h(v_i) = -\frac{v_i}{K} - \frac{a_0}{K^2}\ln\left(1 - \frac{K \cdot v_i}{a_0}\right);$$

$v_i$ is the present velocity; and
$x_i$ is the present position.

49. The system of claim 48, wherein, once f is solved for, the selected deceleration profile generally has the form $$a_i = \frac{h(v_i) - h(v_T)}{x_i - x_\tau}(a_0 - K \cdot v_i).$$

50. The system of claim 48, wherein the deceleration controller is configured to determine $h(v_i)$ and $h(v_T)$ on-the-fly.

51. The system of claim 48, wherein values for $h(v_i)$ and $h(v_T)$ that correspond to numerous possible velocities and numerous possible positions are pre-computed and stored.

52. The system of claim 51, wherein the deceleration controller is configured to solve for f using the stored values for $h(v_i)$ and $h(v_T)$.

53. The system of claim 31, wherein the BEMF constant can differ for different positions along a stroke of the drive, and wherein the BEMF constant used for selecting the deceleration profile is a predetermined BEMF constant corresponding to the present position.

54. A disk drive system, comprising:
a rotatable disk including at least one surface to store information;
a read/write head from and write to the disk;
an actuator assembly including a voice coil motor (VCM) that is used to control movement of the read/write head, wherein the VCM has an associated back electromagnetic field (BEMF) constant; and a deceleration controller to control a deceleration phase of a seek operation that is used to move the read/write head to a desired velocity and a desired position in phase space, wherein the deceleration controller is configured to select a deceleration profile, based on a present velocity ($v_i$) and a present position ($x_i$) of the read/write head and the BEMF constant, wherein the deceleration profile defines a path in phase space from the present velocity and present position to a target velocity and a target position where it is useful to switch from the deceleration phase to a settling phase of the seek operation, rather than defining a path in phase space from the present velocity and present position to the desired velocity and the desired position, wherein the target velocity and the target position are offset, respectively, from the desired velocity and the desired position; and wherein the deceleration controller is further configured to control movement of the read/write head using the selected deceleration profile.

55. The system of claim 54, further comprising:

a VCM driver to drive the VCM;

wherein the deceleration controller supplies a control signal to the VCM driver in order to control movement of the read/write head.

56. The system of claim 54, wherein the BEMF constant can differ for different positions along a stroke of the drive, and wherein the BEMF constant used for selecting the deceleration profile is a predetermined BEMF constant corresponding to the present position.

57. The system of claim 54, wherein the deceleration controller is configured to:

select a new deceleration profile each time a new present velocity and new present position are obtained during the same deceleration phase of the same seek operation; and control movement of the read/write head using the new selected deceleration profile.

58. The system of claim 54, wherein control of a seek operation is transferred from the deceleration controller to a settle controller when a predetermined condition is satisfied.

* * * * *

UNITED STATES PATENT AND TRADEMARK OFFICE
CERTIFICATE OF CORRECTION

PATENT NO. : 7,054,099 B2
APPLICATION NO. : 10/958013
DATED : May 30, 2006
INVENTOR(S) : Fred R. Hansen It is certified that error appears in the above-identified patent and that said Letters Patent is hereby corrected as shown below:

At Column 12, Claim 6, Line 56, replace "$v_T$" with --$v_I$--;

At Column 13, Claim 13, Line 42, replace "transition" with --transitions--;

At Column 14, Claim 18, Line 13, replace "k •$v_T$" with --K • $v_I$--;

At Column 15, Claim 28, Line 34, after "phase" insert --space--;

At Column 16, Claim 31, Line 17, replace "form" with --from--;

At Column 16, Claim 31, Line 31, replace "defined" with --defines--;

At Column 17, Claim 36, Line 14, replace "$v_T$" with --$v_I$--;

At Column 18, Claim 54, Line 65, after "head" insert --to read--;

At Column 20, Claim 57, Line 14, after "and" insert --a--.

Signed and Sealed this

Fifth Day of December, 2006

JON W. DUDAS
*Director of the United States Patent and Trademark Office*